United States Patent [19]
Greig

[11] 3,874,750
[45] Apr. 1, 1975

[54] THRUST BEARINGS
[75] Inventor: Bernard James Greig, Bradford, England
[73] Assignee: Lucas Aerospace Limited, Birmingham, England
[22] Filed: Mar. 26, 1973
[21] Appl. No.: 344,554

[30] Foreign Application Priority Data
Mar. 25, 1972  United Kingdom............... 14119/72
Sept. 21, 1972  United Kingdom............... 43719/72
Dec. 2, 1972  United Kingdom............... 55802/72

[52] U.S. Cl. ................................................. 308/10
[51] Int. Cl. ............................................ F16c 39/06
[58] Field of Search.......... 308/10; 74/4.7; 73/517 B

[56] References Cited
UNITED STATES PATENTS
2,725,266   11/1955   Mendelsohn.......................... 308/10
2,785,023   3/1957   Naumann.............................. 308/10
3,011,842   12/1961   Norris.................................. 308/10
3,016,274   1/1962   Norris.................................. 308/10
3,243,238   3/1966   Lyman.................................. 308/10
3,465,598   9/1969   Simon................................... 308/10
3,493,274   2/1970   Emslie .................................. 308/10
3,493,275   2/1970   Stone................................... 308/10

Primary Examiner—R. Skudy
Attorney, Agent, or Firm—Holman & Stern

[57] ABSTRACT

A permanent magnet thrust bearing in which there is provided a pair of members mounted rspectively on a shaft and a fixed body, with one of said members being formed from high permeability material and the other member being a permanent magnet, with said members being continuously presented to each other so in use the shaft rotates relative to the fixed body so that the magnetic flux of said permanent magnet serves to locate said shaft axially with respect to the body.

6 Claims, 7 Drawing Figures

THRUST BEARINGS

BACKGROUND OF THE INVENTION

This invention relates to a permanent magnet thrust bearing and has as its object the provision of such a bearing in a convenient form.

SUMMARY OF THE INVENTION

In accordance with the present invention, there is provided a permanent magnet thrust bearing including a pair of members mounted respectively on a shaft and a fixed body, with one of said members being formed from high permeability material and the other of said members comprising a permanent magnet, the members being continuously present to each other so that in use during rotation of the shaft, the magnetic flux serves to locate the shaft axially with respect to the body.

Conveniently, the axial width of said members is equal or substantially equal.

Preferably said other member is mounted on said fixed body and said one member is mounted on said shaft.

Desirably, said other member is annular.

Conveniently, said one member is in the form of an annular or cylindrical insert in the shaft wherein the remainder of said shaft is formed of low permeability material. Conveniently, said other member is annular and has a pair of annular pole pieces located against opposite axial faces of the other member, each of said pole pieces having a frusto-conical inner peripheral surface in which the smaller diameter axial end of each pole piece is arranged adjacent to said other member. The pole pieces may be formed of soft iron or mild steel and conveniently, said pole pieces are secured by an adhesive to said other member.

Alternatively, said one member is in the form of a land defined by two axially spaced circumferentially extending grooves formed in the shaft which is itself formed of high permeability material.

As a further alternative, said one member is constituted by a portion of a shaft which is formed entirely of high permeability material and the other member is a permanent magnet mounted on said fixed body. Preferably, two of said other members are spaced apart in a direction parallel to the axis of said shaft. Conveniently, said permanent magnet (s) is annular and surrounds said portion of the shaft. Alternatively, said shaft is hollow and said permanent magnet(s) is received in one axial end of the shaft. Desirably, means are provided to reduce the leakage flux of the permanent magnet(s).

Conveniently, in addition, said permanent magnet thrust bearing acts as an air journal bearing.

The inventionn will now be more particularly described with reference to the accompanying drawings wherein

DETAILED DESCRIPTION OF THE EMBODIMENTS

Figure 1:
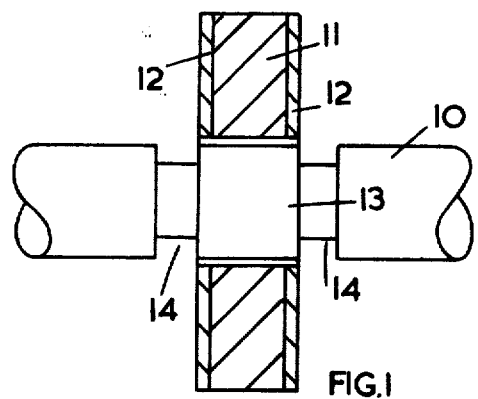
FIG. 1 is a part sectional view of one embodiment of a permanent magnet thrust bearing constructed in accordance with the present invention.

Referring to FIG. 1 of the drawings, the permanent magnet thrust bearing shown therein includes a pair of members one of which is mounted on a rotatable shaft 10 and is formed from high permeability material, such as mild steel, and the other of which comprises a permanent annular magnet 11 which surrounds the shaft 10. The annular magnet 11 has a mild steel pole piece 12 mounted on each axial end of the magnet and the latter is preferably a ceramic magnet manufactured under the trade name Feroba by James Neill Limited. The magnet 11 is mounted on a fixed body (not shown) in such a manner that it cannot move relative to said fixed body.

The aforesaid one member is in the form of a land 13 defined by two axially spaced circumferentially extending grooves 14 formed in the shaft 10 and the axial width of the land 13 is equal to or substantially equal to the axial width of the magnet 11 together with its pole pieces 12. The arrangement of the land 13 and the magnet 11 is such that they are continuously presented to each other.

The shaft 10 is conveniently intended for rotation at extrememly high speeds, such as for example for rotation at speeds of up to 60,000 r.p.m and it will be understood that for the shaft to rotate at such speeds, then it will be journalled in air bearings and may conveniently be driven by a hysteresis motor (not shown). Upon rotation of the shaft, the radial magnetic flux set up by the magnet 11 will serve to locate the shaft axially with respect to the magnet and therefore the aforesaid fixed body.

Figure 2:
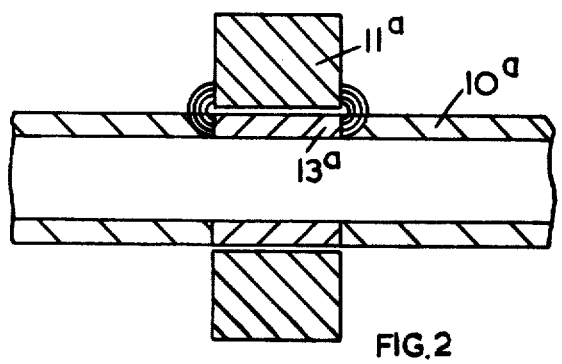
FIG. 2 is a sectional view of a further embodiment of a permanent magnet thrust bearing constructed in accordance with the present invention.

Referring now to FIG. 2 of the accompanying drawing, the permanent magnet thrust bearing shown therein comprises a shaft 10a which as shown is hollow but this need not necessarily be the case. The shaft 10a is formed of low permeability material such as, for example 18/8 stainless steel or aluminium, and the shaft 10a has an annular insert 13a which is formed of high permeability material, such as for example mild steel, and which forms said one member in this embodiment. There is also provided an annular magnet 11a formed of the same material as the magnet 11, but in this embodiment, the magnet 11a is not provided with any pole pieces although, of course, if desired these could be added. The magnet 11a is, as described with reference to the first embodiment, mounted on a fixed body (not shown) and the axial width of the magnet 11a is equal to or substantially equal to the axial width of the insert 13a. The shaft 10a may once again be mounted in air bearings for rotation at high speeds and during rotation of the shaft 10a, the magnetic flux set up by the magnet 11a will serve to locate the shaft axially with respect to the aforesaid fixed body.

It is to be appreciated that in both the foregoing embodiments, the land 13 or the insert 13a may be in the form of a magnet while the magnet 11 or 11a may be in the form of an annulus of high permeability material. Moreover, the magnet 11 or 11a need not necessarily be annular but may be formed by one or more pole pieces mounted adjacent to the land 13 or insert 13a respectively so that the aforesaid two members are continuously presented to each other.

In a further embodiment, the land 13 of FIG. 1 may be replaced by a portion of a shaft having an annular groove formed therein defining a pair of axially spaced shoulders on the shaft. The pole pieces of the magnet are arranged with their inner axial faces aligned with the edges of said shoulders so that a radial magnetic flux set up between the pole pieces and the shoulders serve to locate the shaft axially with respect to the magnet.

Finally, it is envisaged that a thrust bearing as above described may be incorporated into an air journal bearing.

Figure 4:
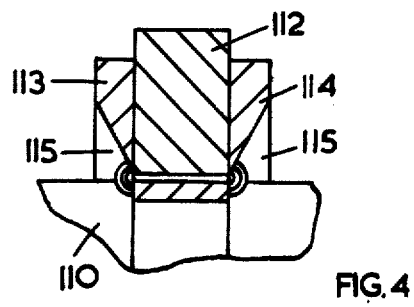
FIG. 4 is an enlarged sectional view of the embodiment shown in FIG. 3 but illustrating the flux pattern set up.
Figure 3:
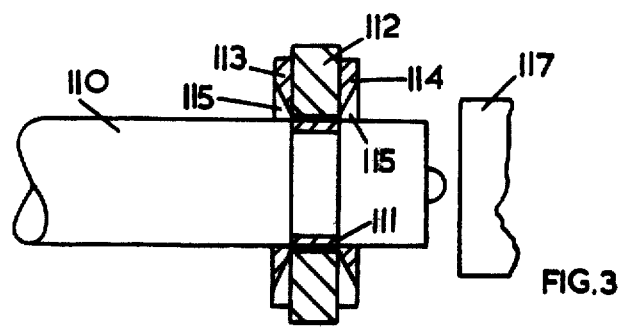
FIG. 3 is a sectional view of yet a further embodiment of a permanent magnet thrust bearing constructed in accordance with the present invention.

Referring now to FIGS. 3 and 4 of the accompanying drawings, the permanent magnet thrust bearings shown therein comprise a shaft 110 formed of low permeability material such as for example 18/8 stainless steel or aluminium. The shaft 110 has an annular insert 111 which is formed of high permability material, such as for example mild steel, and there is also provided a permanent annular magnet 112 with the magnet being preferably a ceramic magnet manufactured under the trade name Feroba. The magnet 112 is axially magnetized so that a north pole exists at one axial end of the magnet and a south pole exists at the other axial end of the magnet. The magnet 112 is mounted on a fixed body (not shown) and the axial width of the magnet 112 is equal to or substantially equal to the axial width of the insert 111.

A pair of soft iron or mild steel annular pole pieces 113 and 114 are secured to opposite axial faces of the magnet 112 by an adhesive such as known by the trademark "Araldite." Each pole piece 113, 114 has a frusto-conical inner peripheral surface indicated at 115 in which the smaller diameter axial end of each pole piece is arranged adjacent to the magnet 112. These pole pieces 113 and 114 serve to concentrate the flux as shown more particularly in FIG. 2 and this gives rise to greater magnetic forces for maintaining the magnet 112 and the insert 111 in an axial alignment than if these pole pieces were omitted.

One axial end of the shaft 110 has a centrally disposed sapphire pip 116. Mounted adjacent to but spaced from the pip 116 and aligned axially with the shaft 110 is an axially adjustable carbon abutment 117. The pip 116 will engage the abutment 117 if the shaft 110 is subjected to shock load.

Figure 5:
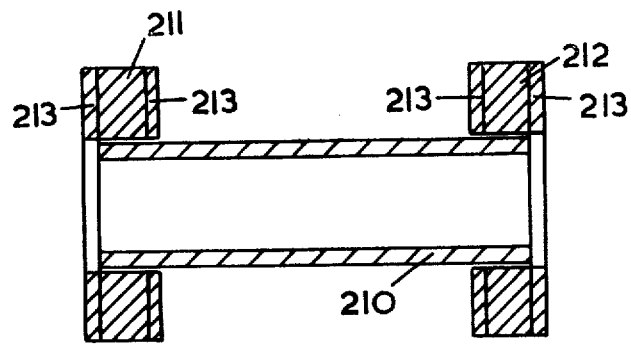
FIGS. 5 to 7 are sectional views of yet further embodiments of a permanent magnet thrust bearing constructed in accordance with the present invention.

Referring now to FIG. 5 of the accompanying drawings, the permanent magnet thrust bearing shown therein comprises a rotatable, hollow shaft 210 formed entirely from high permeability material, such as mild steel, and a pair of annular oppositely but axially polarized permanent magnets 211 and 212 which surround the shaft 210 and which are axially spaced with respect to each other. The annular magnets 211 and 212 each have mild steel pole pieces 213 mounted on each axial end of each magnet and the magnets are preferably ceramic magnets manufactured under the trade name Feroba by James Neill Limited. The magnets 211 and 212 are mounted on one or more fixed bodies (not shown) in such a manner that they cannot move relative to said fixed body or bodies.

The shaft 210 is intended for rotation at extremely high speeds, such as, for example, for rotation at speeds of up to 60,000 r.p.m. and it will be understood that for the shaft to rotate at such speeds then it will be journalled in air bearings and conveniently may be driven by an hysteresis motor (not shown). In use, the magnetic flux set up by the magnets will serve to locate the shaft axially with respect to the magnets and therefore with respect to the aforesaid fixed body.

Figure 6:
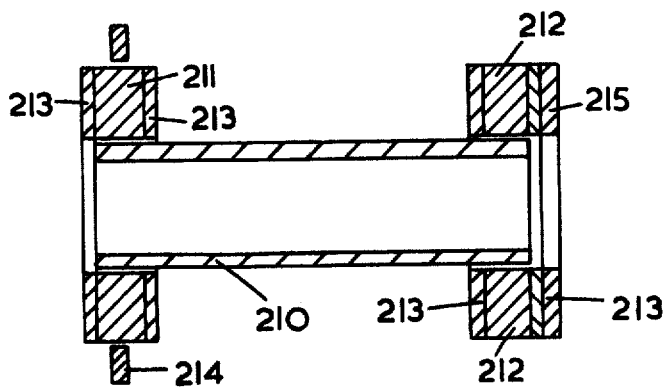

Referring now more particularly to FIG. 6 of the accompanying drawings, the permanent magnet thrust bearing shown therein is similar to that shown in FIG. 5 except that means are provided to reduce the leakage flux of the permanent magnets 211 and 212. Two forms of such means are shown, one associated with the magnet 211 and the other associated with the magnet 212. However, it is to be appreciated that one or other of these means would normally be used with both magnets. Referring first of all to the means associated with the magnet 211, this is in the form of a further annular magnet 214, the internal diameter of which is slightly greater than the external diameter of the magnet 211 so that the magnet 214 can surround the magnet 211. The cross-sectional dimensions of the magnet 214 are smaller than the dimensions of the magnet 211 and the magnet 214 is axially polarized in the same direction as the magnet 211 to minimize leakage flux passing between opposite axial ends of the magnet 211 through a region radially outwardly of the external periphery of the magnet 211. Referring now more particularly to the means assoicated with the magnet 212, this means is in the form of a further annular permanent magnet 215 which has the same internal and external diameters as the internal and external diameters of the magnet 212 and which is polarized axially in an opposite direction with respect to the polarization of the magnet 212 and arranged coaxially with the latter in axial contact with pole piece 213 associated with the magnet 212 remote from the magnet 211. The magnet 215 does not surround the shaft 210 and therefore does not introduce any magnetic flux into the shaft 210, but it concentrates the flux produced by the magnet 212 to minimize the leakage flux thereof. Magnets 214 and 215 are conveniently made from flexible rubber/ceramic magnets that can, for example, be cut by means of scissors.

Figure 7:
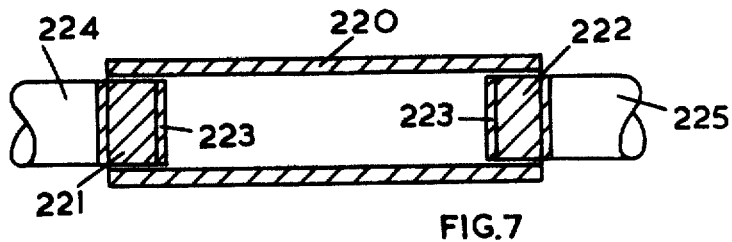

Referring now more particularly to FIG. 7 of the accompanying drawings, the permanent magnet thrust bearing shown therein comprises a hollow, open ended, rotatable shaft 220 formed of high permeability material, such as mild steel, and a pair of solid, cylindrical permanent magnets 221 and 222 each of which has a pair of mild steel pole pieces 223 mounted on each axial end of the respective magnet. The magnets 221 and 222 together with their associated pole pieces are each secured to one axial end of a cylindrical fixed stud 224, 225 respectively with, the magnets 221 and 222 being received in opposite open ends of the hollow shaft 220 so that the latter surrounds the two magnets 221 and 222 which are axially spaced apart and polarized in opposite axial directions. In use, the magnetic flux set up by the magnets 221 and 222 will serve to locate the shaft axially with respect to these magnets.

It is to be understood that the arrangement of magnets shown in FIG. 5 may be combined with the arrangement of magnets shown in FIG. 6 to act on a single common shaft.

I claim:

1. A permanent magnet thrust bearing including a stationary member, a shaft, and a member mounted on the shaft, one of said members being of high permeability material and the other said members comprising a permanent magnet, the members being continously presented to each other so that in use during rotation of the shaft, the magnetic flux serves to locate the shaft axially with respect to the stationary member, said one member being mounted on said shaft, said other member being annular and having opposite axial faces and a pair of annular pole pieces located against said opposite axial faces of the other member.

2. The thrust bearing as claimed in claim 1 wherein each of said pole pieces has a frusto-conical inner peripheral surface and the smaller diameter axial end of each pole piece being arranged adjacent to said other member.

3. The thrust bearing as claimed in claim 2 wherein said pole pieces are of soft iron.

4. The thrust bearing as claimed in claim 2 wherein an adhesive secures said pole pieces to said other member.

5. The thrust bearing as claimed in claim 2 wherein said pole pieces are of mild steel.

6. A permanent magnet thrust bearing including a stationary member, a shaft of high permeability material, and a member on the shaft, one of said members being constituted by a portion of the shaft and the other of said members comprising a permanent magnet, the members being continuously presented to each other so that in use during rotation of the shaft, the magnetic flux serves to locate the shaft axially with respect to the stationary member, said shaft being hollow and said permanent magnet being received in one axial end of the shaft.

* * * * *